(12) United States Patent
Headley

(10) Patent No.: US 7,496,994 B1
(45) Date of Patent: Mar. 3, 2009

(54) CONNECTING DEVICE USING A MAGNET

(76) Inventor: Theresa Headley, 225 Crossroads Blvd, #422, Carmel, CA (US) 93923

( * ) Notice: Subject to any disclaimer, the term of this patent is extended or adjusted under 35 U.S.C. 154(b) by 0 days.

(21) Appl. No.: 11/867,667

(22) Filed: Oct. 4, 2007

(51) Int. Cl.
A44B 13/00 (2006.01)

(52) U.S. Cl. .................... 24/303; 24/697.2; 24/698.1

(58) Field of Classification Search ............... 24/303, 24/598.4, 683, 684, 686, 697.2–698.2
See application file for complete search history.

(56) References Cited

U.S. PATENT DOCUMENTS

| | | | |
|---|---|---|---|
| 2,552,728 A | 5/1951 | Liner | |
| 2,648,884 A | 8/1953 | Loofboro | |
| 3,404,440 A | 10/1968 | Weiss | |
| 4,655,054 A | 4/1987 | Roesh | |
| 4,763,489 A | 8/1988 | Strong | |
| 4,989,299 A | 2/1991 | Morita | |
| 5,125,134 A | 6/1992 | Morita | |
| 5,165,257 A | 11/1992 | Corenblith | |
| 5,311,647 A | 5/1994 | Levy | |
| 5,323,516 A | 6/1994 | Hartmann | |
| 5,572,772 A | 11/1996 | Morita | |
| 5,826,309 A | 10/1998 | Tsamas | |
| 5,865,042 A | 2/1999 | Cerqua | |
| 5,921,110 A | 7/1999 | Middendorff | |
| 6,446,466 B1 * | 9/2002 | Headley | 63/3.1 |
| 6,591,462 B2 | 7/2003 | Fuhrman | |
| 6,640,398 B2 | 11/2003 | Hoffman | |
| 6,857,169 B2 * | 2/2005 | Chung | 24/303 |
| 7,073,232 B1 | 7/2006 | Fuhrman et al. | |
| 2003/0229974 A1 | 12/2003 | Goepfer | |

FOREIGN PATENT DOCUMENTS

FR 2629693 10/1989

* cited by examiner

Primary Examiner—James R Brittain
(74) Attorney, Agent, or Firm—Intellectual Property Law Group LLP; Otto O. Lee; Juneko Jackson (57) ABSTRACT

An improved connecting device for assembling two components is described. The device comprises at least one magnetic male component and at least one magnetic female component. A male component comprises a bull-nose or beveled end integral with a hook and a magnet. A female component comprises an aperture with a guiding curvature, a groove in the same side with the guiding curvature, and a magnet receptacle or magnetic portion to which the magnet of the male component can be attached. A magnetic force between the magnet and the magnetic element of the receptacle in combination with the curved shapes of the female and male components achieve safe and secure engagement of the two components. The components of the device are located in the backside, thereby creating an unalterable appearance from the front. The device is interchangeable in a countless number of combinations.

13 Claims, 6 Drawing Sheets

CONNECTING DEVICE USING A MAGNET

BACKGROUND OF THE INVENTION

1. Field of Invention

Aspects of the invention relate to a connecting device for assembly of a wide variety of components, including but not limited to jewelry components, accessories, appendages, general hardware components or toy components.

2. Background

A need exists for a connecting device that safely and securely connects components so as to prevent loss of those components and that guides components easily so that users of the device can connect components without difficulty. A need also exists for a connection device that offers unlimited interchangeability with other components while providing for the appearance of a singular, unalterable entity.

Existing products designed to offer interchangeable use with other components do not provide secured connection. In particular, when existing products are designed for expensive jewelry components, safe and secure connection of components is critical. Furthermore, existing products are limited in their adaptability and/or include visible clamp, eye, hook, clasp, or aperture from the front, thereby offering limited versatility. Existing products are visible from the front. Unlike embodiments of the present invention, existing products do not have the appearance of a singular, unalterable entity. Prior solutions with magnets are often large and cumbersome, and interfere with the aesthetics of the design.

Many existing magnetic devices are not secure enough because the magnet merely holds the weight of the device. Without more safety features, the device can easily be pulled apart upon contact with another object. Furthermore, many magnetic devices are so large that they interfere with the aesthetics of the design.

Information relevant to attempt to address these problems can be found in existing products. However, each existing product suffers from one or more of the following disadvantages: having loose connection of components thereby creating a risk of loss of those components; having difficulty in connecting components; having visible eyelets and capture hooks integrally associated with the product's peripheral surfaces; having a plurality of knobs and clips; limited application because it can only be suspended from a chain; segmentation with an eyelet; in order to be used as a necklace, having to be hung on a chain thereby having a disconnected appearance; having limited applications, for example, an application only to certain types of components.

The existing products mentioned above are not admitted to be prior art with respect to the present invention by its mention in this Background Section.

SUMMARY

The present invention is directed to a magnetic connecting device that satisfies the need for a connecting device that safely and securely connects components so as to prevent loss of those components and that guides components easily so that users of the device can connect components without difficulty. The present invention is also directed to a magnetic connecting device that offers unlimited interchangeability with other components while providing for the appearance of a singular, unalterable entity.

A connecting device having features of an embodiment of the present invention comprises a magnetic first/female component and a magnetic second/male component. The first/female component comprises a plate having a top and a bottom, an aperture on the plate, a guiding curvature on the bottom of the plate which begins at a rim of the aperture, a magnet receptacle on the plate, a groove on the bottom of the plate between the aperture and the magnet receptacle, and a hook trap on the bottom of the plate beginning at a rim of the aperture next to the groove. On the other hand, the second/male component comprises a prong having an underside; a bull-nose or beveled end at the end of the prong; a hook on the underside of the prong connected to/integral to the bull-nose or beveled end, the hook having an inside curvature on the underside of the prong; a magnet on the underside of the prong. The magnet is sized to fit the magnet receptacle and is spaced apart by a distance that can accommodate the insertion or contact of the magnet into the magnet receptacle upon lodging the hook in the hook trap. All or a part of the magnet receptacle comprises a magnetic material. A shape of the bull-nose or beveled end and the guiding curvature is calibrated to accommodate insertion of the prong into the aperture of the plate. The inside curvature and the hook trap are calibrated to accommodate lodging of the hook in the hook trap.

According to another embodiment of the present invention, the magnet receptacle is instead a magnetic portion or magnetic area on the plate and the magnet is sized and spaced on the underside of the prong to accommodate the contact of the magnet to the magnetic portion upon lodging the hook in the hook trap.

Embodiments of the present invention include different configurations of a magnet of a male component and a magnet receptacle of a female component. For example, the magnet may protrude out, be installed inside the male component so that the magnet and the underside of the male component may belong to a same planar surface, or be installed at an angle so that a portion of the magnet protrudes from the male component.

An object of an embodiment of the present invention is to provide for security by safely and securely connecting components so as to prevent loss of those components and guiding components easily so that users of the device can connect components without difficulty. An embodiment of the present invention cannot be disassembled while engaged with components. The magnet of a male component prevents the male component from being disassembled by holding the male component firmly while engaged. In addition to the magnet, the bull-nose or beveled end of a male component and the curved plate of a female component are interlocked when engaged, and can only disengage when it is off the body. The weight of the objects joined with this device is carried by the hook of a male component, which holds both the male and female components strong and secure.

An object of an embodiment of the present invention is to provide for flexibility of combining components. Flexibility in limitless interchangeability of all components in many different ways is provided so as to create a complete and vast collection of jewelry or accessory components with invisible connections, giving the appearance of an unalterable entity. Furthermore, flexibility in length or width is provided so as to have a variety of applications.

An object of an embodiment of the present invention is to provide for an unalterable appearance. According to an embodiment of the present invention, upon assembling components, there is no indication that the resulting entity can in any way be disassembled. No hooks, clips, hinges, clasps, or any hardware is visible from the front and all sides because all pieces with female components built in are completely finished on the front and all sides. The ports of a female component are in the back, and invisible from the front and the sides when being worn. While pieces with a male component are connected, the prongs lie flatly, hidden in the back, out of view as well.

An object of an embodiment of the present invention is to provide a user with easy assembly of components using a magnet, which easily guides a male component into a port of a female component.

Embodiments of the present invention solve problems of risk of disassembly of components while engaged by including two safety means. Components are connected safely and securely so as to prevent loss of those components by holding the male component down and by interlocking the bull-nose or beveled end of a male component and the curved plate of a female component when engaged.

Embodiments of the present invention solve problems of limited combinations of components by being capable of assembling a wide variety of components. For example, any object with an attached male component may be attached to an earring, a pin, a shoe, a hat, a purse, a belt, or anything that has a female component built in.

Embodiments of the present invention give the appearance of an unalterable entity, because a fastening device is internal, and accessible only from the reverse side of each piece, making it invisible from the front, and even from the sides. Furthermore, this appearance of an unalterable entity offers versatility in that one piece can be attached or worn in many different positions and locations. For example, a centerpiece can be attached vertically, horizontally, diagonally, suspended either vertically or horizontally, or attached as a bracelet, brooch, or earring.

An embodiment of the present invention provides a linear object with adjustable length. Examples of a linear object include anything that can be made of a linear segment such as a necklace, belt, strap, purse, hardware item, and toy. In the embodiment of the present invention, a linear object can be made longer by inserting a linear segment, or shorter by subtracting a linear segment without that addition or subtraction being obvious. Other applications of embodiments of the present invention include a single component being worn in a necklace, an earring, a brooch, a pendant or a bracelet. A timepiece containing this device can transform a bracelet into a watch with any number of interchangeable bands.

These and other embodiments of the present invention are further made apparent, in the remainder of the present document, to those of ordinary skill in the art.

BRIEF DESCRIPTION OF THE DRAWINGS

In order to more fully describe embodiments of the present invention, reference is made to the accompanying drawings. These drawings are not to be considered limitations in the scope of the invention, but are merely illustrative.

FIG. 3A to FIG. 3D illustrate how to engage a male component and a female component, according to an embodiment of the present invention.

DETAILED DESCRIPTION OF SPECIFIC EMBODIMENTS

The description above and below and the drawings of the present document focus on one or more currently preferred embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention.

Figure 1A:
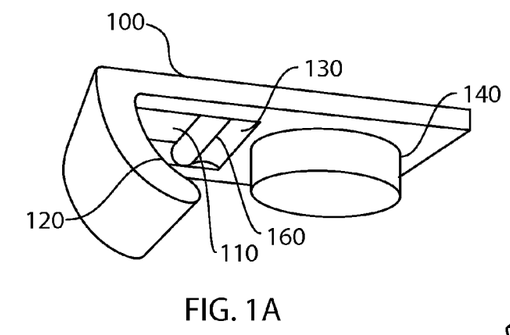
FIG. 1A and FIG. 1B show a first/female component, in different perspectives according to an embodiment of the present invention.

FIG. 1A shows a perspective view of a first component, or a female component of the device, which is attached to the back of a component or accessory, according to an embodiment of the present invention. The female component comprises a plate 100, an aperture 110 on the plate 100, a guiding curvature 120 on the back of the plate 100 which begins at a rim of the aperture 110, a groove 130 on the back of the plate 100, a magnet receptacle 140, and a hook trap 160 at a rim of the aperture 110 that is connected to the groove 130. The groove 130 is located on the back of the plate 100 and between the aperture 110 and the magnet receptacle 140. The hook trap 160 is located at a rim of the aperture 110 that is connected to the groove 130.

Figure 1B:
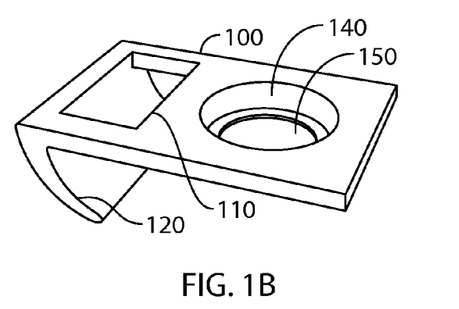
Figure 1C:
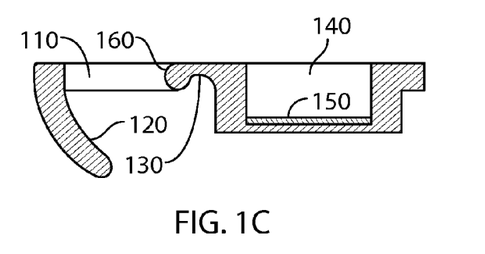
FIG. 1C is a cross-sectional side view of the device of FIG. 1A.

FIG. 1B shows the female component of the device of FIG. 1A in a different perspective view. As shown, the inside of the magnet receptacle 140 is visible. The female component further comprises a magnetic element such as a magnetic strip 150 positioned on the inside bottom surface of the magnet receptacle 140. The magnetic element 150 may lie inside, upon or beneath the magnet receptacle 140 such that it may magnetically engage with a magnet. FIG. 1C is a cross-sectional side view of the female component of FIG. 1A showing an elevation of the female component, according to an embodiment of the present invention.

Figure 1D:
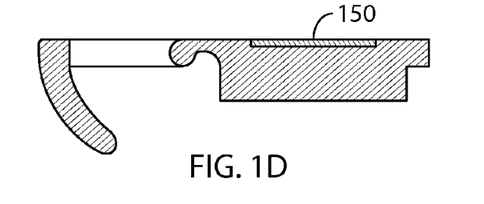
FIG. 1D and FIG. 1E are cross-sectional side views of a female component according to different embodiments of the present invention.

FIG. 1D is a cross-sectional side view of a female component according to an embodiment of the present invention, where a magnetic element 150 and the backside of the plate 100 belong to a same planar surface. As such, a magnet receptacle having an opening is not required. Rather, magnetic element 150 functions as a magnetic portion of the plate 100.

Figure 1E:
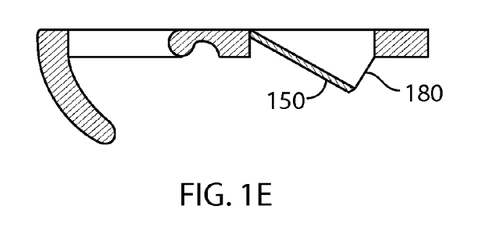

FIG. 1E is a cross-sectional side view of a female component according to an embodiment of the present invention, where the magnet receptacle has a V-shaped nadir 180 that is connected to a rim of the plate 100.

Figure 2A:
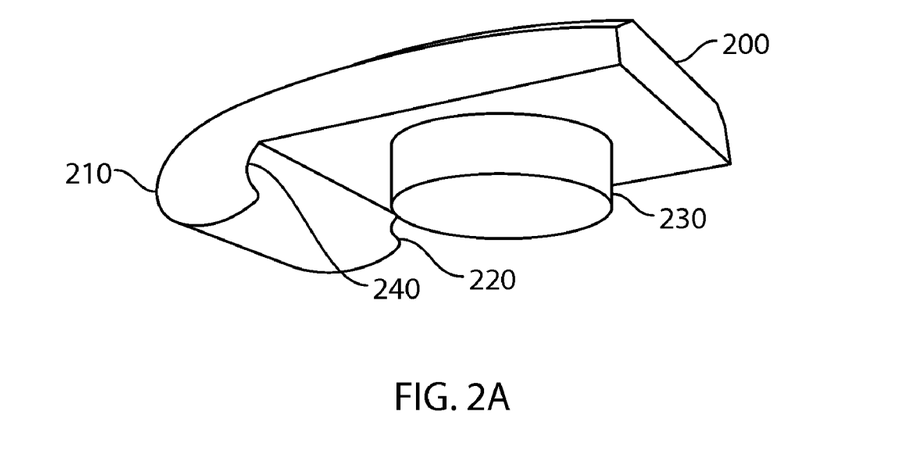
FIG. 2A and FIG. 2B show a second/male component in different perspectives according to an embodiment of the present invention.

FIG. 2A shows a perspective view of a second component, or a male component of the device according to an embodiment of the present invention, which is attached to the end of a component or accessory. The male component of FIG. 2A matches to the female component of FIG. 1A. The male component comprises a prong 200, a bull-nose/beveled end 210, a hook 220, a magnet 230 attached to the bottom of the prong 200, and an inside curvature 240 of the prong. The bull-nose end 210 is a curved end of the prong 200 which would enter into the aperture 110 of the female component. The magnet 230 is the same size and shape as the magnet receptacle 140 of the female component. The bottom of the magnet 230 is capable of touching the magnetic element 150 of the plate 100. In an embodiment of the present invention, the magnet 230 is a rare earth magnet.

Figure 2B:
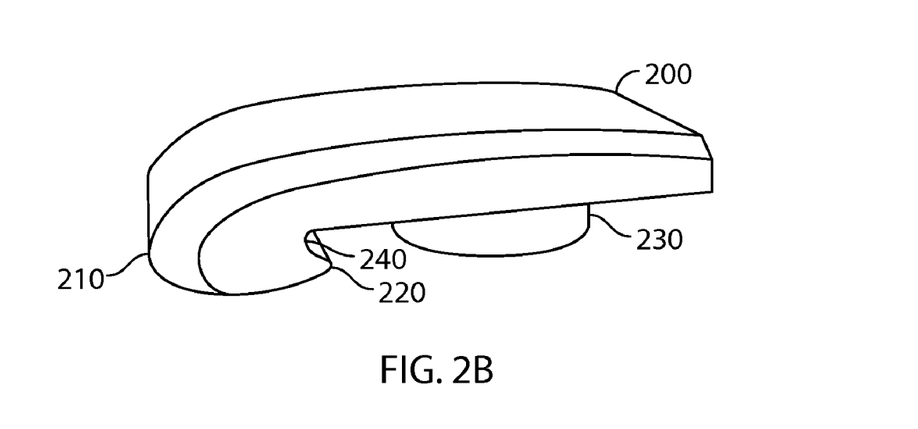
Figure 2C:
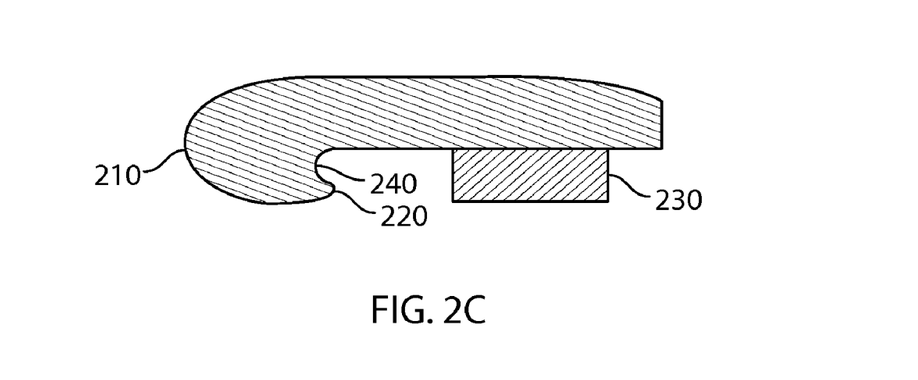
FIG. 2C is a cross-sectional side view of the device of FIG. 2A.

FIG. 2B shows another perspective view of the male component of FIG. 2A. FIG. 2C is a cross-sectional side view of the male component of FIG. 2A showing an elevation of the male component, according to an embodiment of the present invention. The shape of the bull-nose end 210 and inside curvature 240 of the prong 200 are calibrated to facilitate insertion of the prong 200 into an aperture 110 of the female component. Moreover, the guiding curvature 120 and the hook trap 160 of the female component are calibrated to accommodate lodging of the hook 220 of the male component in the hook trap 160.

Figure 2D:
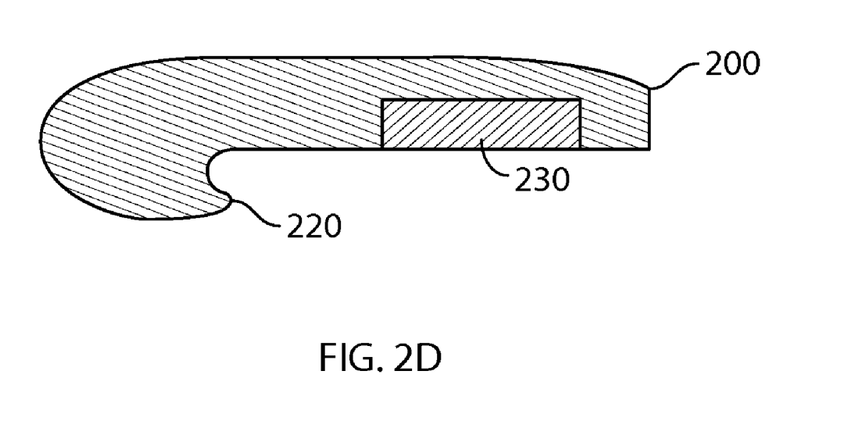
FIG. 2D and FIG. 2E are cross-sectional side views of a male component according to different embodiments of the present invention.

FIG. 2D is a cross-sectional side view of a male component according to an embodiment of the present invention, which matches to the female component of FIG. 1D. The bottom of the magnet 230 and the backside of the prong 200 belong to a same planar surface. As such the magnet 230 rests flush against the plate 100 of the female component.

Figure 2E:
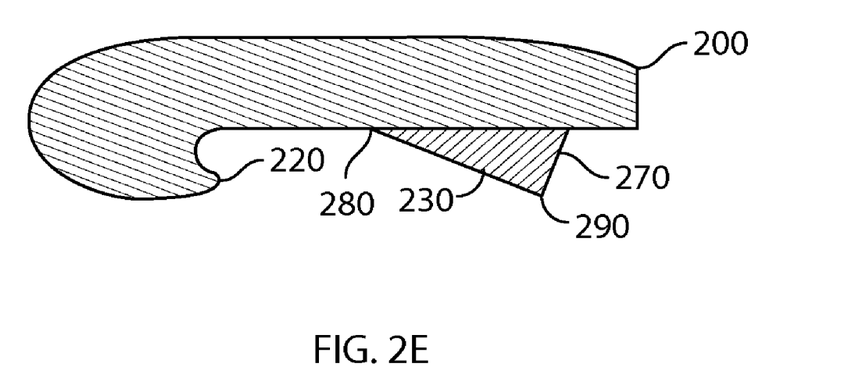

FIG. 2E is a cross-sectional side view of a male component according to an embodiment of the present invention, which matches to the female component of FIG. 1E. The bottom of the magnet 230 is positioned at an angle so that a front end 280 of the bottom of the magnet 230 that is closest to the hook 220 touches a rim of the plate 100 and a back end 290 of the bottom of the magnet 230 that is furthest from the hook 220 has a distance from the underside of the prong 200. As a result, the magnet exposed under the prong has a triangular shape, as viewed in cross-section.

Figure 3A:
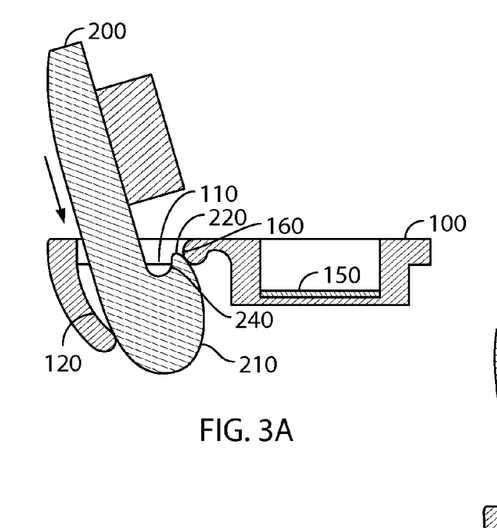
FIG. 3A to FIG. 3D show cross-sectional views illustrating an operational concept of an embodiment of the present invention. In particular.
Figure 3B:
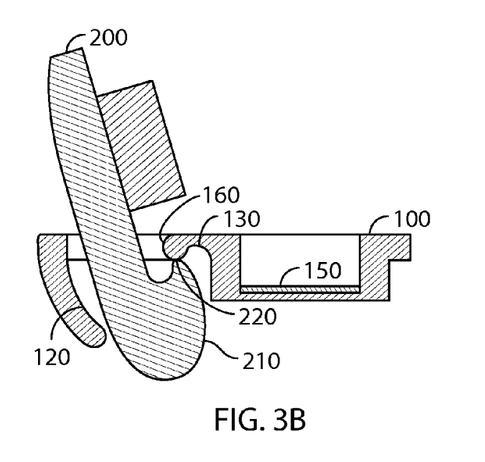
Figure 3C:
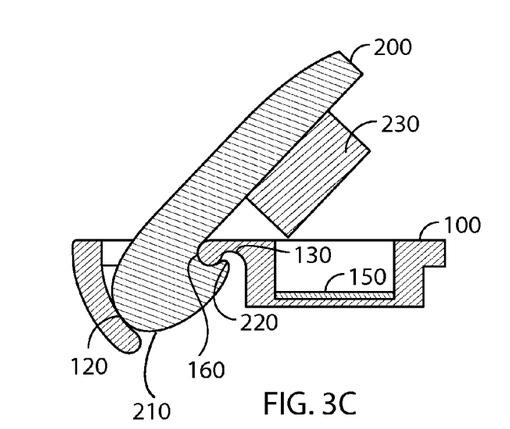

FIGS. 3A to 3C show cross-sectional views illustrating how to engage the male component and the female component so as to create a secure union, according to an embodiment of the present invention. FIG. 3A shows the male component being inserted into the aperture 110 of the plate 100, according to an embodiment of the present invention. Upon inserting the bull-nose end 210 into the aperture 110 of the plate 100, the guiding curvature 120 guides the bull-nose end 210 so that the hook 220 can smoothly pass the hook trap 160 of the plate 100.

In this embodiment of the present invention, the profile of the male component, in relation to the inside curvature 240 of the underside of the prong 200, makes the engagement with the female component secure and causes the male component to be locked in place.

FIG. 3B shows the male component being guided by the guiding curvature 120 of the plate 100, according to an embodiment of the present invention. As the bull-nose end 210 drops passing the hook trap 160 of the plate 100, the guiding curvature 120 of the plate 100 pushes the hook 220 so that the hook 220 can fit into the groove 130 of the plate 100.

FIG. 3C illustrates rotation of the male component according to an embodiment of the present invention. Upon lodging the hook 220 in the groove 130 of the plate 100, the bull-nose end 210 is guided by the guiding curvature 120 of the plate 100 while keeping the hook 220 lodged under the hook trap 160. As the magnet 230 gets closer to the magnetic element 150 of the plate 100, a magnetic force pulls between the magnet 230 of the prong 200 and the magnetic element 150, which makes the rotation easier. Upon the bottom of the magnet 230 touching the magnetic element 150 of the plate 100, both the male and female components are secured in place.

Figure 3D:
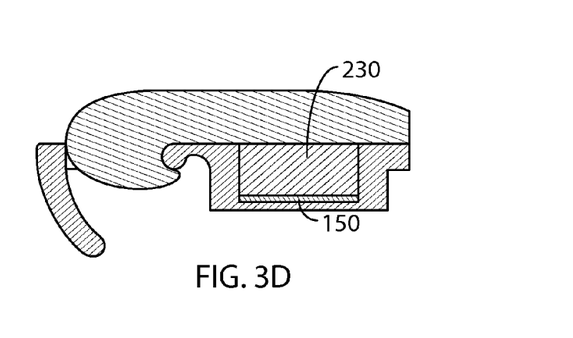

FIG. 3D shows the male and female components, totally engaged, with the bottom of the magnet 230 attached to the magnetic element 150, according to an embodiment of the present invention.

Figure 4A:
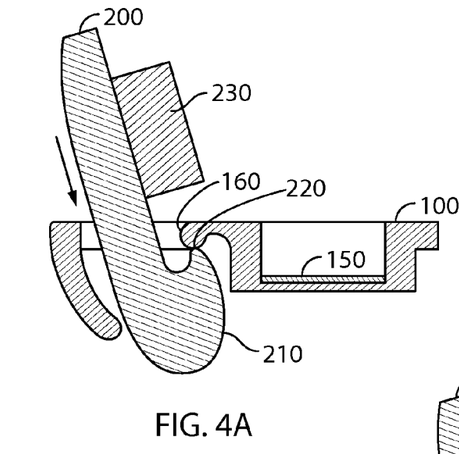
FIG. 4A and FIG. 4B show cross-sectional views illustrating an operational concept of an embodiment of the present invention; illustrating how to disengage a male component and a female component.
Figure 4B:
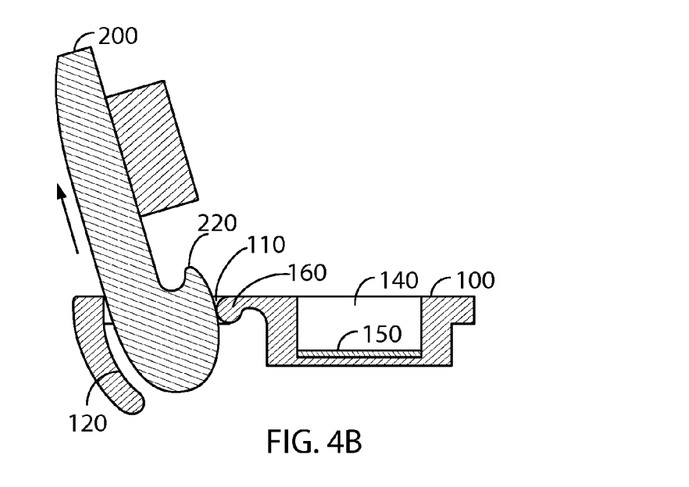

FIGS. 4A to 4B show cross-sectional views illustrating how to disengage the male component and the female component, according to an embodiment of the present invention. As shown in FIG. 4A, as the magnet 230 of the prong 200 is detached from the magnetic element 150 of the plate 100, the bull-nose end 210 of the prong 200 is dropped down until the hook 220 can slide out of the hook trap 160 at an angle greater than 90°.

FIG. 4B shows removal of the male component from the aperture 110 of the plate 100, thereby separating the male and female components, according to an embodiment of the present invention. The guiding curvature 120 of the plate 100 guides the male component as the male component is removed from the aperture 110 of the plate 100 so that the hook 220 of the prong 200 can pass the hook trap 160 of the plate 100.

As shown in the discussed figures, the components are designed to fit in precise ways such that the engagement of the female component with the male component results in a secure and eye appealing connection. A good fit can be achieved by a precise structure of the components, for example, a distance between a distal point of the beveled end 210 of the prong 200 and a point in the inside curvature 240 is made equal to a distance between a point in the guiding curvature 120 and an edge of the hook trap 160 closest to the aperture 110. A distance between a distal point of the beveled end 210 of the prong 200 and an end of the hook 220 is made greater than a distance between a point in the guiding curvature 120 and an edge of the hook trap 160 closest to the aperture 110. A distance between a distal point of the beveled end 210 of the prong 200 and a farthest end of the magnet 230 away from the distal point is made equal to the distance between, a point on the rim of the aperture 100 where the front of the plate 100 and the guiding curvature 120 join, and a farthest end of the magnet receptacle 140 or magnetic portion 150 that is away from the guiding curvature 120.

Figure 5:
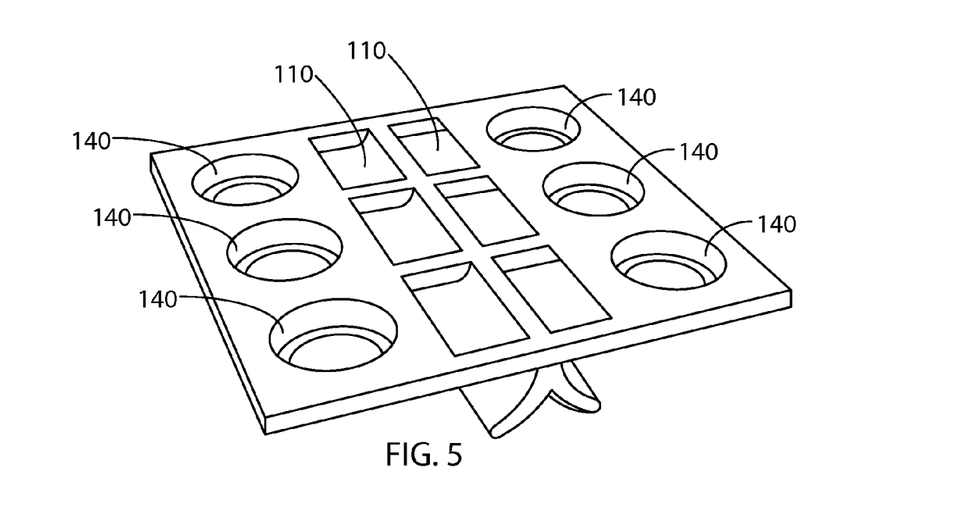
FIG. 5 shows an embodiment of the present invention comprised of six female components.

FIG. 5 shows an embodiment of the present invention, comprised of six female components, three on each side of a female component plate, including six apertures 110 and six magnet receptacles 140, thereby capable of holding six male components. Other variations of number, size and placement of female components including apertures 110 and magnet receptacles 140 are possible to accommodate variations in and number of design components.

Figures 6A, 6B:
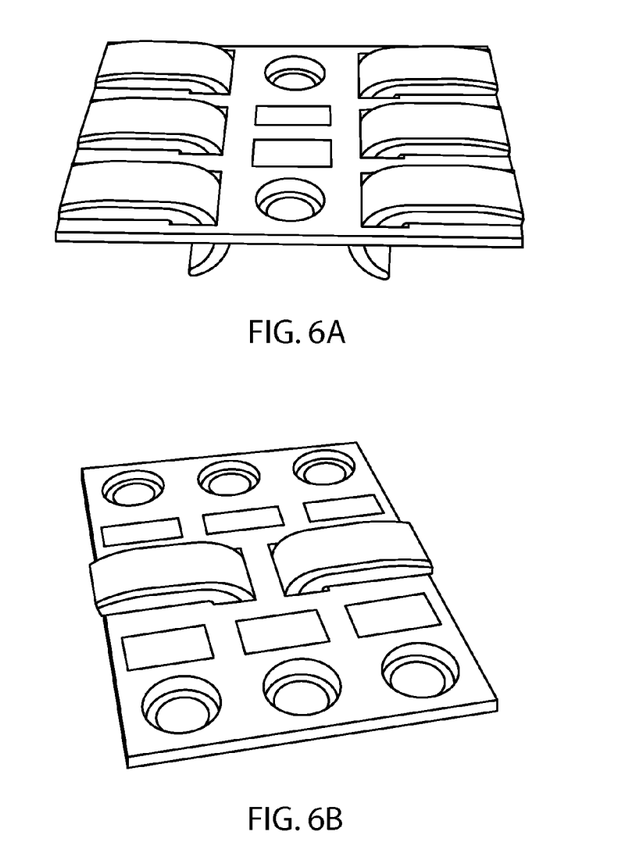
FIG. 6A shows an embodiment of the present invention comprised of eight female components, six of them engaged.
FIG. 6B shows the same embodiment as FIG. 6A, with two ports engaged.

FIGS. 6A to 6B show an embodiment of the present invention, comprised of eight female components, three on each end and two in the middle of a female component plate. In FIG. 6A, six male components are engaged in the six apertures and corresponding magnet receptacles along the two short sides of the plate. FIG. 6B shows the same embodiment of the device in FIG. 6A wherein two male components are engaged in the two middle apertures and magnet receptacles of the plate.

In embodiments of the present invention, the width of a male component or a female component may be variable as long as the width of one component matches to that of the other component. Furthermore, in embodiments of the present invention, the width of an aperture of a female component and the width of a magnet receptacle of a female component may also be variable as long as the width of the aperture and the width of the magnet receptacle correspond to that of a bull-nose or beveled end of a male component and that of a magnet of a male component, respectively.

Figure 7:
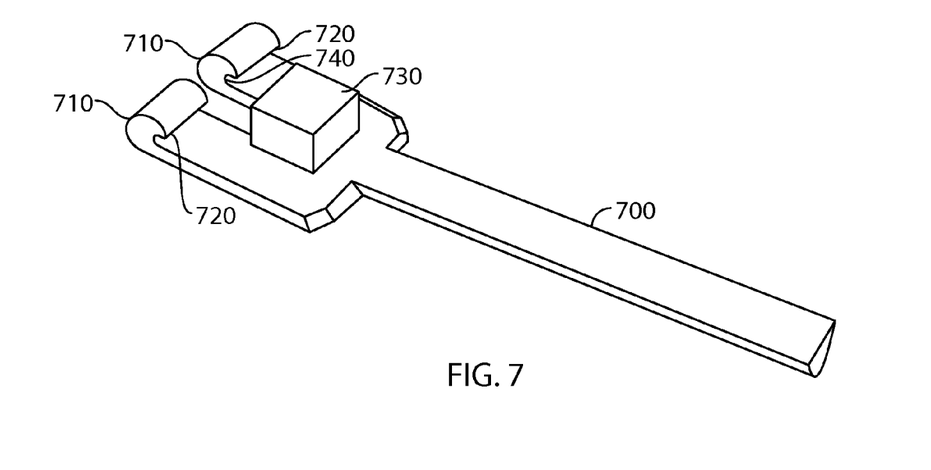
FIG. 7 shows a male component which is a double prong variation of an embodiment of the present invention.

FIG. 7 shows a male component according to an embodiment of the present invention. The male component of FIG. 7 comprises a prong section 700, two bull-nose ends 710, two hooks 720, two inside curvatures 740, and one magnet 730. Compared to the male component of FIG. 2, the male component of FIG. 7 includes an additional bull-nose end 710, one more hook 720, and one more inside curvature 740. The female component (not shown) that corresponds to the male prong of FIG. 7 includes, as compared to the female component of FIG. 1, one more aperture, one more guiding curvature, one more groove, and one more hook trap.

An embodiment of the present invention is suitable for a computer-aided design and manufacturing program owing to close tolerance nature for design and manufacture of the device.

Although the present invention has been described in considerable detail with reference to certain preferred versions, other versions are possible. For example, any number of female components can be attached to the back of an element so as to allow numerous combinations. Furthermore, a female component and a male component may include a layout that is different from the layout shown in the drawings. Throughout the description and drawings, example embodiments are given with reference to specific configurations. It will be appreciated by those of ordinary skill in the art that the present invention can be embodied in other specific forms. Therefore, the spirit and scope of the appended claims should not be limited to the description of the preferred versions contained therein. All changes that come within the meaning and range of equivalents within the claims are intended to be considered as being embraced within the spirit and scope of the claims.

What is claimed is:

1. A connecting device comprising a female component and a male component,
    the female component comprising a plate having a top and a bottom; an aperture on the plate; a guiding curvature on the bottom of the plate beginning at a rim of the aperture; a magnet receptacle on the top of the plate; a groove on the bottom of the plate located between the aperture and the magnet receptacle; and a hook trap on the bottom of the plate beginning at a rim of the aperture that is next to the groove; and
    the male component comprising a prong having an underside and a beveled end being calibrated to accommodate insertion of the prong into the aperture of the plate; a hook on the underside of the prong and integral to the beveled end, the hook having an inside curvature on the underside of the prong, wherein the inside curvature and the hook trap of the female component being calibrated to accommodate lodging of the hook in the hook trap; a magnet attached to the underside of the prong sized to fit the magnet receptacle of the female component; and the magnet being spaced at a distance that can accommodate the contact of the magnet to the magnet receptacle upon lodging the hook in the hook trap.

2. The connecting device according to claim 1, further comprising
    a magnetic element located at an inside bottom surface of the magnet receptacle, and
    a bottom of the magnet being capable of contacting the magnetic element.

3. The connecting device according to claim 2, wherein the magnet receptacle and magnetic element are positioned at an angle to have a triangular cross-section such that a front end of the magnetic element that is closest to the hook touches a rim of the plate, and a back end of the magnetic element that is furthest from the hook is located a distance past the underside of the prong, and
    wherein the bottom of the magnet is positioned at an angle such that a front end of the bottom of the magnet that is closest to the hook touches a rim of the plate and a back end of the bottom of the magnet that is furthest from the hook is located a distance past the underside of the prong.

4. The connecting device according to claim 1, wherein a top surface of the magnet receptacle and the top of the plate belong to a same planar surface; and an exposed surface of the magnet and the underside of the prong belong to a same planar surface.

5. The connecting device according to claim 1, wherein a distance between a distal point of the beveled end of the prong and a point in the inside curvature is equal to a distance between a point in the guiding curvature and an edge of the hook trap closest to the aperture.

6. The connecting device according to claim 1, wherein a distance between a distal point of the beveled end of the prong and an end of the hook is greater than a distance between a point in the guiding curvature and an edge of the hook trap closest to the aperture.

7. The connecting device according to claim 1, wherein a distance between a distal point of the beveled end of the prong and a farthest end of the magnet away from the distal point is equal to the distance between a point on the rim of the aperture where the front of the plate and the guiding curvature join and a farthest end of the magnet receptacle away from the guiding curvature.

8. The connecting device according to claim 1, wherein upon inserting the prong into the aperture the hook passes the hook trap, wherein the prong is rotatable until the magnet contacts the magnet receptacle and the hook is lodged into the hook trap, thereby engaging the prong and the plate.

9. The connecting device according to claim 1, wherein, at an engagement of the prong and the plate, the prong is rotatable to detach the magnet from the magnet receptacle, wherein the beveled end of the prong is dropped down until the hook slides out of the hook trap at an angle greater than 90°, releasing the prong to be lifted up until the hook passes the hook trap, thereby disengaging the prong and the plate.

10. The connecting device according to claim 1, wherein the device comprises a plurality of female components and a plurality of male components.

11. The connecting device according to claim 1, wherein the magnet is a rare earth magnet.

12. A connecting device for connecting appendages, the device comprising: a first component attached to an appendage, and a second component attached to an appendage,
    the first component comprising a plate having a top and a bottom; an aperture on the plate; a guiding curvature on the bottom of the plate beginning at a rim of the aperture; a magnetic portion on the plate; a groove on the bottom of the plate located between the aperture and the magnetic portion; and a hook trap on the bottom of the plate beginning at a rim of the aperture that is next to the groove; and the second component comprising a prong having an underside and a beveled end being calibrated to accommodate insertion of the prong into the aperture of the plate; a hook on the underside of the prong and integral to the beveled end, the hook having an inside curvature on the underside of the prong, wherein the inside curvature and the hook trap of the first component being calibrated to accommodate lodging of the hook in the hook trap; a magnet attached to the underside of the prong sized to engage the magnetic portion of the first component; and the magnet being spaced at a distance that can accommodate the contact of the magnet to the magnetic portion upon lodging the hook in the hook trap;

wherein the magnetic portion is inset into the plate and positioned at an angle to have a triangular cross-section such that a front end of the magnetic portion that is closest to the hook touches a rim of the plate, and a back end of the magnetic portion that is furthest from the hook is located a distance past the underside of the prong, and wherein the bottom of the magnet is positioned at an angle such that a front end of the bottom of the magnet that is closest to the hook touches a rim of the plate and a back end of the bottom of the magnet that is furthest from the hook is located a distance past the underside of the prong.

13. The connecting device according to claim 12, wherein the device comprises a plurality of first components and a plurality of second components.

* * * * *